F. HACHMANN.
JOINT.
APPLICATION FILED DEC. 30, 1918.

1,367,134.

Patented Feb. 1, 1921.

Inventor
Frederick Hachmann
by Edward E. Longan
Atty.

ated Feb. 1, 1921.
UNITED STATES PATENT OFFICE.

FREDERICK HACHMANN, OF ST. LOUIS, MISSOURI, ASSIGNOR OF ONE-HALF TO HERMAN STIFEL, OF ST. LOUIS, MISSOURI, ONE-EIGHTH TO DAVID M. HUTCHINSON, OF FERGUSON, MISSOURI, AND ONE-SIXTEENTH TO PHILIP E. MOODY, ONE-SIXTEENTH TO CHAUNCEY R. WATSON, AND ONE-SIXTEENTH TO H. A. WRIGHT, ALL OF DETROIT, MICHIGAN.

JOINT.

1,367,134.  Specification of Letters Patent.  Patented Feb. 1, 1921.

Application filed December 30, 1918. Serial No. 269,018.

*To all whom it may concern:*

Be it known that I, FREDERICK HACHMANN, citizen of the United States, and resident of St. Louis, Missouri, have invented certain new and useful Improvements in Joints, of which the following is a specification containing a full, clear, and exact description, reference being had to the accompanying drawings, forming a part hereof.

My invention relates to improvements in joints and method of making the same and has for its primary object the formation of a joint, or connection whereby two members or parts are joined without weakening the parts connected and at the same time rendering the connection invisible and especially relates to a connection for metallic parts or members.

In the drawings:

Fig. 4 is an enlarged view of the connecting member made use of.

Figure 1:
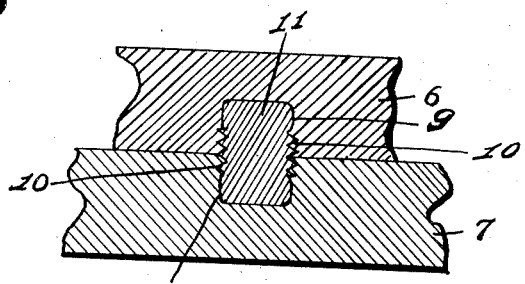
Figure 1 is a sectional view of my improved joint or connection.
Figure 2:
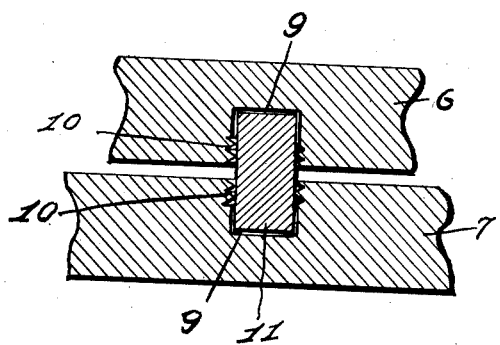
Fig. 2 is a sectional view illustrating the different parts of the connection before the same are finally set.

Referring to the drawings, 6 and 7 illustrate the parts or members to be connected. These parts or members are preferably metal and in the special application of my invention, I employ it for connecting together two members of a piston ring, although it may be employed for connecting other various parts or members where it is desired not to weaken the connected parts and also where it is desired to conceal the joining member.

Figure 3:
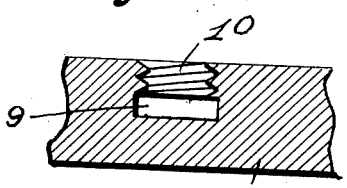
Fig. 3 is a section of one of the members illustrating the formation of the hole or bore.
Figure 4:
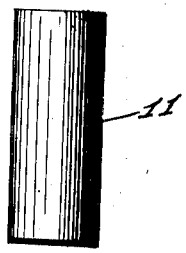
Figure 5:
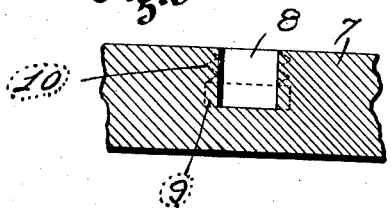
Fig. 5 is a sectional view of the first step in forming the bore of one of the connected parts, showing the finished bore in dotted lines.

The first step or operation in carrying out my improvement is the formation in the parts 6 and 7 of a straight bore 8 as illustrated in Fig. 5. After the straight bore 8 has been formed in each member 6 and 7, I enlarge the bottom end of the bore as at 9. After this operation, I screw thread the bore as at 10 as illustrated in Fig. 3. It will be observed that the enlargement 9 is of about the same diameter as the extreme diameter of the threaded portion, the threaded portion extending however within the diameter of the enlarged portion 9. It will also be observed that the finished bore as illustrated in Fig. 3 only extends a short distance in the members 6 and 7 and not sufficient to weaken these parts materially.

After the bore has been finished in the parts 6 and 7 to be connected, I then insert in these bores a connecting cylindrical member 11. This member 11 is of softer and more malleable material than the parts to be connected and is of such diameter that it may be easily inserted in the bores of the parts to be connected and is of a length slightly more than the combined depths of the bores. When the cylindrical member 11 has been inserted in the bores of the parts 6 and 7 to be connected, I then apply sufficient pressure to bring the faces of the parts 6 and 7 in close contact. This pressure will upset the cylindrical member 11, expanding the ends of the same into the enlargements 9 and the threads 10 of each bore, thus firmly uniting the parts together. It will be observed that when the parts 6 and 7 are forced together by pressure, this operation will shorten the cylindrical member 11 and enlarge its diameter. It will also be observed that when the parts 6 and 7 are connected as hereinbefore described, it is practically impossible to separate the parts, either by twisting or pulling and further, that the connecting member is invisible. As previously pointed out, my invention is especially applicable to connecting together two metallic parts where it is advisable not to materially weaken the parts connected or to have no rivets or connections exposed.

Having fully described my invention, what I claim is:

1. The herein described method of forming a joint which consists in taking a pair of metallic members and forming in their contacting faces bores which extend only partially through each member, screw threading said bores, inserting a rivet whose diameter is slightly less than the diameter of the bores and whose length is greater than the combined depth of the bores, and then applying pressure to the metallic members so as to bring their contacting faces together and upset the rivet within the bores.

2. The herein described method of forming a joint which consists in taking a pair of metallic members and forming in their contacting faces bores which extend only partially through each member, screw threading said bores, and under cutting the lower end of each bore, inserting a rivet whose diameter is slightly less than the diameter of the bores and whose length is greater than their combined depth, and then applying pressure to the metallic members so as to bring their contacting faces together and upset the rivet within the bore.

In testimony whereof, I have signed my name to this specification, in the presence of two subscribing witnesses.

FREDERICK HACHMANN.

Witnesses:
ELIZABETH CARTALL,
WALTER C. STEIN.